US009172857B2

(12) United States Patent
Yamamoto

(10) Patent No.: US 9,172,857 B2
(45) Date of Patent: Oct. 27, 2015

(54) IMAGE CAPTURE APPARATUS, IMAGING LENS, AND IMAGE CAPTURE SYSTEM

(71) Applicant: CANON KABUSHIKI KAISHA, Tokyo (JP)

(72) Inventor: Yuji Yamamoto, Kasukabe (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 13/659,269

(22) Filed: Oct. 24, 2012

(65) Prior Publication Data

US 2013/0141622 A1 Jun. 6, 2013

(30) Foreign Application Priority Data

Dec. 1, 2011 (JP) ................................ 2011-264113

(51) Int. Cl.

*H04N 5/238* (2006.01)
*H04N 5/232* (2006.01)
*G03B 7/095* (2006.01)
*G03B 7/20* (2006.01)
*G03B 17/14* (2006.01)

(52) U.S. Cl.

CPC ................ *H04N 5/232* (2013.01); *G03B 7/095* (2013.01); *G03B 7/20* (2013.01); *H04N 5/238* (2013.01); *G03B 17/14* (2013.01)

(58) Field of Classification Search

CPC ......... H04N 5/232; H04N 5/238; G03B 7/20; G03B 7/095
USPC .................................... 348/363, 360, 333.01
See application file for complete search history.

(56) References Cited

U.S. PATENT DOCUMENTS

| | | | | |
|---|---|---|---|---|
| 4,977,424 A * | 12/1990 | Mukai et al. | 396/150 |
| 5,854,948 A * | 12/1998 | Tsukada | 396/93 |
| 5,892,990 A * | 4/1999 | Ogi | 396/89 |
| 7,817,201 B2 * | 10/2010 | Shmizu et al. | 348/333.01 |
| 2007/0024741 A1 * | 2/2007 | Moriya et al. | 348/363 |
| 2007/0172226 A1 * | 7/2007 | Nakata et al. | 396/374 |
| 2011/0076006 A1 * | 3/2011 | Hirose | 396/508 |
| 2011/0310457 A1 * | 12/2011 | Sasaki | 359/230 |
| 2013/0141622 A1 * | 6/2013 | Yamamoto | 348/333.01 |

FOREIGN PATENT DOCUMENTS

| | | |
|---|---|---|
| JP | 01-164258 | 6/1989 |
| JP | 2010-276674 A | 9/2010 |

OTHER PUBLICATIONS

Aug. 28, 2015 Japanese Office Action, issued in Japanese Patent Application No. 2011264113.

* cited by examiner

*Primary Examiner* — Antoinette Spinks
(74) *Attorney, Agent, or Firm* — Cowan, Liebowitz & Latman, P.C.

(57) ABSTRACT

An image capture system including an image capture apparatus and an imaging lens detachable from the image capture apparatus comprises an image capture unit which captures an image of an object, an aperture which adjusts an amount of light that enters the image capture unit; a stepping motor of a 1-2 phase driving type, which is configured to drive the aperture, and a control unit which controls to set the stepping motor in a current applied state when the aperture is stopped down, and to drive the aperture by a difference between an aperture value while the aperture is stopped down and an aperture value for still image capture, when a still image capture instruction is issued while the aperture is stopped down.

5 Claims, 14 Drawing Sheets

F I G. 2
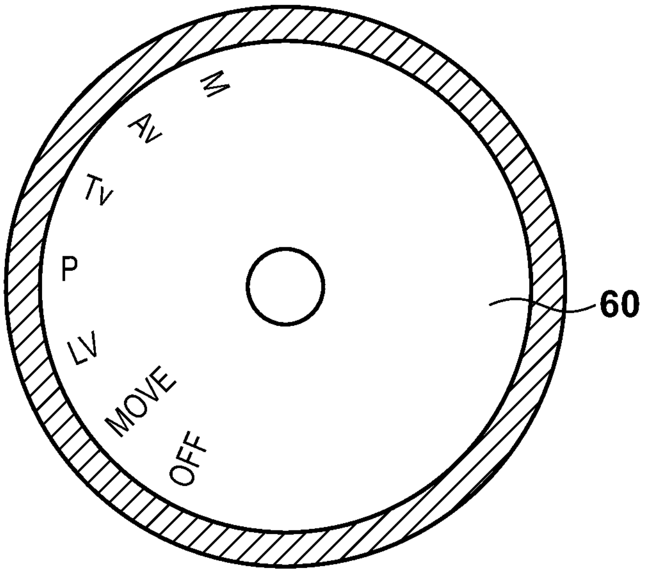

F I G. 4
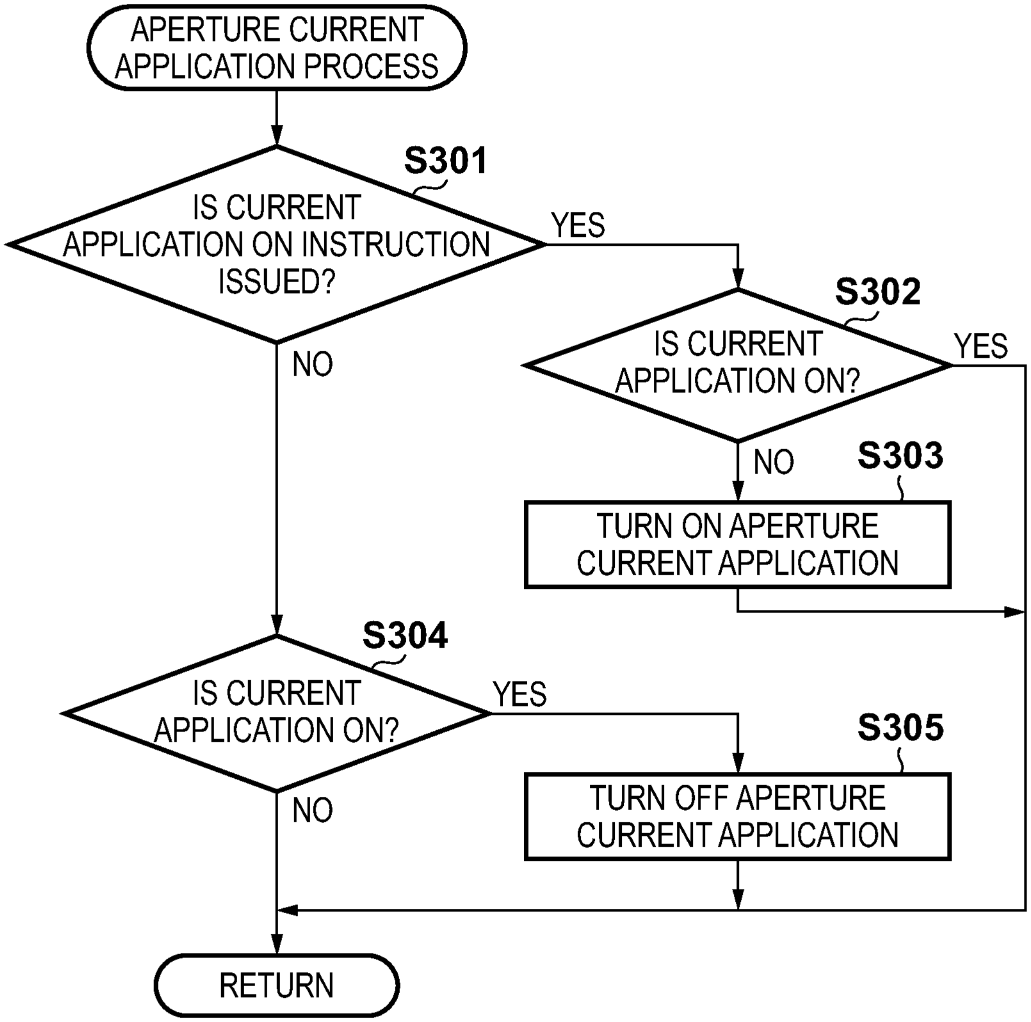

F I G. 5
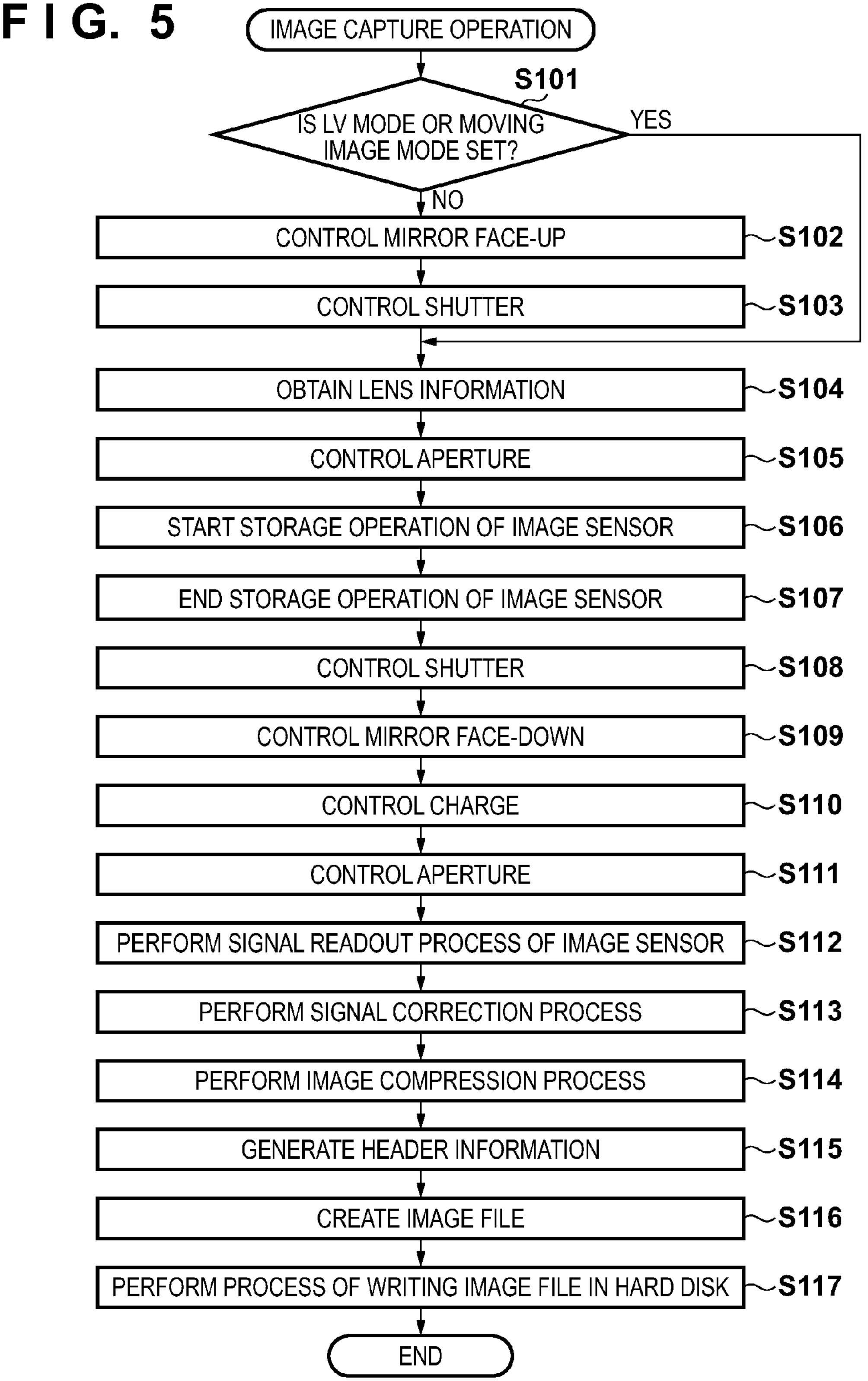

(PRIOR ART)

IMAGE CAPTURE APPARATUS, IMAGING LENS, AND IMAGE CAPTURE SYSTEM

BACKGROUND OF THE INVENTION

1. Field of the Invention

The present invention relates to a digital camera and, more particularly, to lens aperture driving.

2. Description of the Related Art

One conventional image capture apparatus drives an aperture using a stepping motor of the 1-2 phase driving type, as described in Japanese Patent Laid-Open No. 1-164258.

However, a stepping motor of the 1-2 phase driving type, as disclosed in Japanese Patent Laid-Open No. 1-164258 described above, may stop an aperture at a stopped position at which a rotor is unstable due to a cogging torque after the application of a current to the coil is turned off. For this reason, when an aperture is driven using a stepping motor of the 1-2 phase driving type, as disclosed in Japanese Patent Laid-Open No. 1-164258 described above, the aperture position shifts by +1 step or −1 step after the application of a current to the coil is turned off, depending on the aperture stopped position. Therefore, to accurately control the aperture, it is necessary to drive the aperture to the control end to compensate for the shift of the stopped position, and then drive it to a desired stopped position.

When the aperture is driven to the control end and then driven to a desired stopped position in this way, the release time lag in the period from when an instruction to execute still image capture is issued until still image capture is actually executed is prolonged.

SUMMARY OF THE INVENTION

The present invention has been made in consideration of the above-mentioned problem, and shortens the time lag for release when a still image is captured by driving an aperture in a configuration which drives the aperture using a stepping motor of the 1-2 phase driving type.

According to the first aspect of the present invention, there is provided an image capture system including an image capture apparatus and an imaging lens detachable from the image capture apparatus, the system comprising: an image capture unit which captures an image of an object; an aperture which adjusts an amount of light that enters the image capture unit; a stepping motor of a 1-2 phase driving type, which is configured to drive the aperture; and a control unit which controls to set the stepping motor in a current applied state when the aperture is stopped down, and to drive the aperture by a difference between an aperture value while the aperture is stopped down and an aperture value for still image capture, when a still image capture instruction is issued while the aperture is stopped down.

According to the second aspect of the present invention, there is provided an image capture system including an image capture apparatus and an imaging lens detachable from the image capture apparatus, the system comprising: an image capture unit which captures an image of an object; an aperture which adjusts an amount of light that enters the image capture unit; a stepping motor of a 1-2 phase driving type, which is configured to drive the aperture; and a control unit which controls to cancel application of a current to the stepping motor after stopping the aperture at a stopped position at which the stepping motor has a stable phase in stopping the aperture down for a purpose other than still image capture, and to drive the aperture by a difference between an aperture value while the aperture is stopped down and an aperture value for still image capture, when a still image capture instruction is issued while the aperture is stopped down.

According to the third aspect of the present invention, there is provided an image capture apparatus from which an imaging lens which drives an aperture using a stepping motor of a 1-2 phase driving type is detachable, the apparatus comprising: a control unit which controls to set the stepping motor in a current applied state when the aperture is stopped down, and to drive the aperture by a difference between an aperture value while the aperture is stopped down and an aperture value for still image capture, when a still image capture instruction is issued while the aperture is stopped down.

According to the fourth aspect of the present invention, there is provided an image capture apparatus from which an imaging lens which drives an aperture using a stepping motor of a 1-2 phase driving type is detachable, the apparatus comprising: a control unit which controls to cancel application of a current to the stepping motor after stopping the aperture at a stopped position at which the stepping motor has a stable phase in stopping the aperture down for a purpose other than still image capture, and to drive the aperture by a difference between an aperture value while the aperture is stopped down and an aperture value for still image capture, when a still image capture instruction is issued while the aperture is stopped down.

According to the fifth aspect of the present invention, there is provided an imaging lens detachable from an image capture apparatus, the lens comprising: an aperture; and a stepping motor of a 1-2 phase driving type, which is configured to drive the aperture, wherein the stepping motor is set in a current applied state when the aperture is stopped down, and the aperture is driven by a difference between an aperture value while the aperture is stopped down and an aperture value for still image capture, when a still image capture instruction is issued while the aperture is stopped down.

According to the sixth aspect of the present invention, there is provided an imaging lens detachable from an image capture apparatus, the lens comprising: an aperture; and a stepping motor of a 1-2 phase driving type, which is configured to drive the aperture, wherein application of a current to the stepping motor is canceled after stopping the aperture at a stopped position at which the stepping motor has a stable phase in stopping the aperture down for a purpose other than still image capture, and the aperture is driven by a difference between an aperture value while the aperture is stopped down and an aperture value for still image capture, when a still image capture instruction is issued while the aperture is stopped down.

Further features of the present invention will become apparent from the following description of exemplary embodiments with reference to the attached drawings.

BRIEF DESCRIPTION OF THE DRAWINGS

FIG. 2 is a top view of a mode dial switch;

FIG. 4 is a flowchart showing a lens aperture current application process;

FIG. 5 is a flowchart showing the image capture operation of the camera in the first embodiment;

DESCRIPTION OF THE EMBODIMENTS

Embodiments of the present invention will be described in detail below with reference to the accompanying drawings.

First Embodiment

Figure 1:
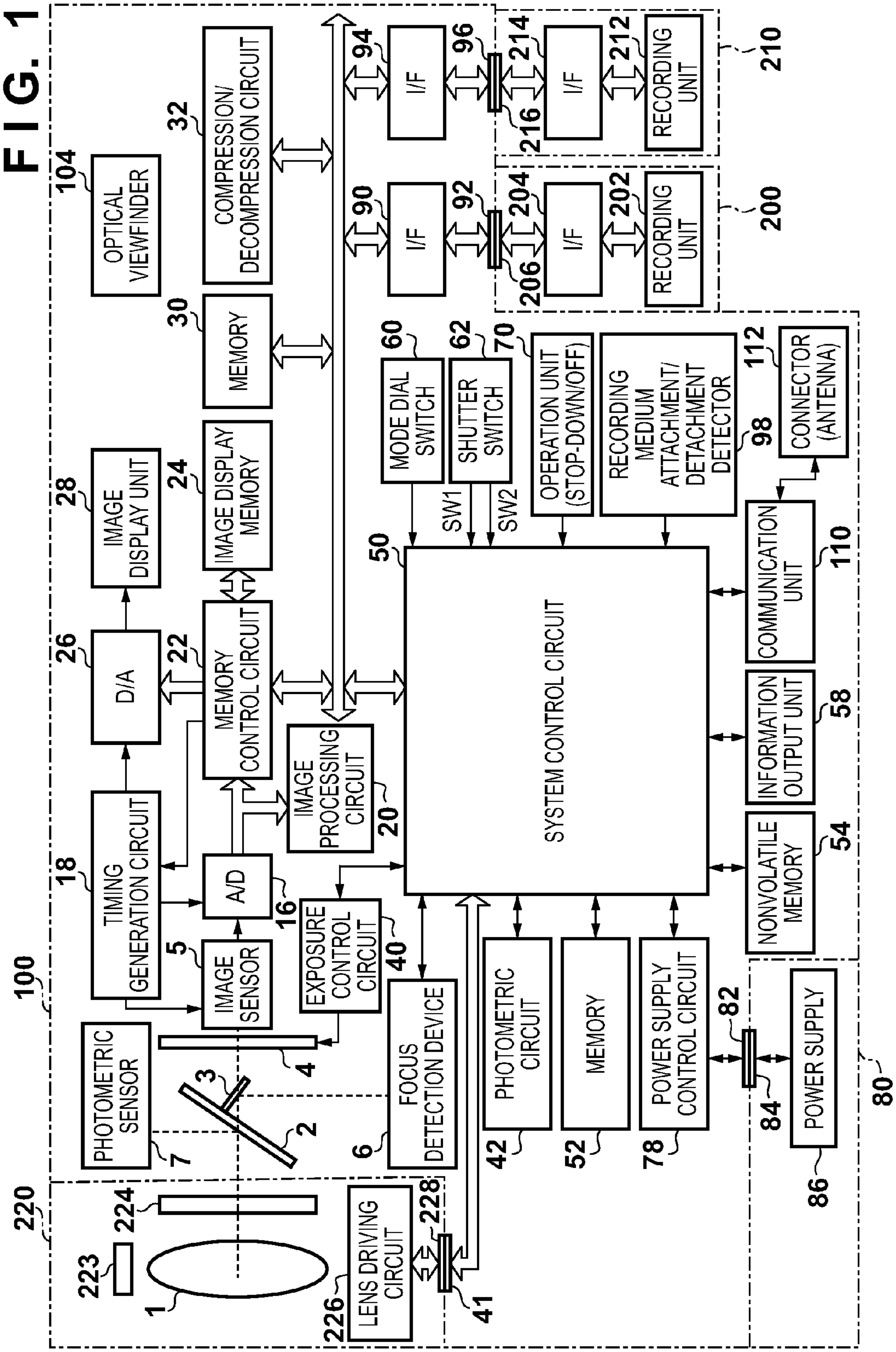
FIG. 1 is a block diagram showing the configuration of a camera according to an embodiment of the present invention.

FIG. 1 is a block diagram showing the configuration of a single-lens reflex digital camera (image capture system) in the first embodiment of the present invention. An imaging lens 220 detachable from a single-lens reflex digital camera (to be simply referred to as a camera hereinafter) 100 is attached to the camera 100.

In the camera 100, a main mirror 2 is free to move to a position oblique to a photographic optical path as observed, or a position retracted from the photographic optical path in an image capture state. A sub-mirror 3 is obliquely inserted in the photographic optical path, and reflects a light beam, having passed through the main mirror 2, downwards of the camera body toward a focus detection device 6.

A shutter 4 controls the exposure time of an image sensor 5. The image sensor 5 is implemented by, for example, a CCD sensor or a CMOS sensor. The image sensor 5 photoelectrically converts an optical image of an object formed through the imaging lens 220. A photometric sensor 7 partially receives the light beam reflected by the main mirror 2, and outputs a luminance signal of the object to a photometric circuit 42.

An A/D converter 16 converts an analog image signal from the image sensor 5 into a digital signal. A timing generation circuit 18 supplies a clock signal to the image sensor 5, the A/D converter 16, and a D/A converter 26. The timing generation circuit 18 is controlled by a memory control circuit 22 and a system control circuit 50.

An image processing circuit 20 performs various image processes such as a pixel interpolation process, a color conversion process, and an AWB (Auto White Balance) process for a digital image signal from the A/D converter 16 or memory control circuit 22. The focus detection device 6 includes a phase difference detection sensor having a plurality of focus detection areas.

The system control circuit 50 controls storage and readout of the focus detection device 6 to calculate the amount of defocus using the known phase difference detection scheme. The system control circuit 50 controls the operation of the overall camera 100, and controls focus driving and aperture driving of the imaging lens 220 from, for example, the amount of defocus. The system control circuit 50 also has a storage control function and display control function (neither is shown).

The memory control circuit 22 controls the A/D converter 16, the timing generation circuit 18, the image processing circuit 20, an image display memory 24, the D/A converter 26, a memory 30, and a compression/decompression circuit 32. An image signal from the image processing circuit 20 or an image signal from the A/D converter 16 is sent to the image display memory 24, memory 30, or system control circuit 50 via the memory control circuit 22.

An image display unit 28 is implemented by, for example, an LCD or a TFT. Display image data written in the image display memory 24 or image data such as a camera setting menu is sent to the image display unit 28 via the D/A converter 26, and displayed on the image display unit 28. Note that the so-called live view function can be implemented by sequentially displaying, on the image display unit 28, images based on image data obtained by capturing the images by the image sensor 5. The memory 30 stores, for example, a generated still image. The memory 30 is also used as a working area for the system control circuit 50.

The compression/decompression circuit 32 compresses/decompresses image data by, for example, ADCT (Adaptive Discrete Cosine Transformation). The compression/decompression circuit 32 reads image data stored in the memory 30 to perform a compression or decompression process, and writes the processed image data in the memory 30 again.

An exposure control circuit 40 controls both the shutter 4 and an aperture 224 of the imaging lens 220 via the system control circuit 50. The photometric circuit 42 outputs a signal output from the photometric sensor 7 to the system control circuit 50.

A memory 52 stores data such as constants, variables, and computer programs for the operation of the system control circuit 50. A nonvolatile memory 54 can electrically erase/record data. An EEPROM, for example, is used as the nonvolatile memory 54.

An information output unit 56 outputs information including the operation state of the camera 100 and given messages using, for example, texts, images, or sounds. The information output unit 56 is implemented by, for example, a liquid crystal display element or a speaker.

A mode dial switch 60 (see FIG. 2) is an operation member for setting OFF and switching of the image capture mode (for example, an LV (Live View) image capture mode, a moving image capture mode, an aperture priority mode, or a program mode). A shutter switch 62 includes an image capture preparation switch SW1 and image capture start switch SW2. Upon the first stroke operation (half press) of a shutter button (not shown), the image capture preparation switch SW1 is turned on to start an image capture preparation operation including a photometry process (AE process) and AF process. Further, upon the second stroke operation (full press) of the shutter button, the image capture start switch SW2 is turned on to start an image capture operation.

Note that the image capture operation includes an operation of opening/closing the shutter 4, an operation of processing an image by the image processing circuit 20 based on an image capture signal from the image sensor 5, and an operation of writing an image signal in the memory 30 via the memory control circuit 22. This image capture operation also includes an operation of reading out image data from the memory 30, compressing it using the compression/decompression circuit 32, and recording it in recording media 200 and 210. This series of image capture operations is also commonly called "an operation of obtaining a recording image".

The recording media 200 and 210 are implemented by, for example, semiconductor memories or optical disks. An operation unit 70 includes, for example, a touch panel and various operation buttons such as a stop-down button, and is operated to display a menu screen for function selection and various settings of the camera 100 and determine menu items. Note that the stop-down button drives the aperture 224 to obtain an aperture value at the time of still image capture without still image capture when a stop-down switch (stop-down SW) is turned on upon pressing of the stop-down button, so that the depth of field at the time of still image capture can be determined during composition confirmation before image capture.

A power supply control circuit 78 includes, for example, a battery detection circuit which detects the remaining battery level, a DC-DC converter which converts a power supply voltage applied from a battery into a predetermined operating voltage, and a switch circuit which switches the block to be applied with a current. A battery 80 is detachable from the camera 100. A primary battery such as an alkaline battery or a lithium battery, or a secondary battery such as an NiMH battery or an Li battery is used for a power supply 86 in the battery 80. Connectors 82 and 84 electrically connect the power supply 86 to the camera 100.

Interfaces 90 and 94 are used to communicate with the recording media 200 and 210, respectively. Connectors 92 and 96 are connected to the recording media 200 and 210, respectively. A recording medium attachment/detachment detector 98 detects whether the recording media 200 and 210 are attached to the connectors 92 and 96, respectively.

A communication unit 110 has a communication function such as RS232C, USB, IEEE 1394, or wireless communication. A connector 112 connects the camera 100 to other devices via the communication unit 110. In wireless communication, an antenna is connected to the communication unit 110.

The recording media 200 and 210 include interfaces 204 and 214 used to communicate with the camera 100, and connectors 206 and 216 which electrically connect the camera 100 to the interfaces 204 and 214, respectively. Compressed image data output from the camera 100 are written in recording units 202 and 212.

On the other hand, in the imaging lens 220, an image capture lens group 1 is formed by a plurality of lenses including a focusing lens which moves in the optical axis direction to adjust the focus, and a zoom lens which moves in the optical axis direction to perform scaling. The aperture 224 adjusts the amount of light that enters the image sensor 5. An image capture optical system is formed by the image capture lens group 1 and aperture 224.

A lens driving circuit 226 controls a stepping motor of the 1-2 phase driving type (not shown) which drives the focusing lens, an actuator which drives the zoom lens, and the aperture 224, in accordance with control signals from the system control circuit 50. Also, the lens driving circuit 226 determines ON/OFF of the application of a current to the stepping motor of the aperture 224, and whether the aperture stopped position is a stable position which remains the same even when the application of a current to the stepping motor of the aperture 224 is turned off. Moreover, the lens driving circuit 226 has a memory function of storing, for example, constants, variables, and programs for the operation of the imaging lens. The lens driving circuit 226 additionally functions as a nonvolatile memory which stores, for example, identification information including a number unique to the imaging lens, management information, function information including a maximum aperture value, minimum aperture value, and focal length, and various current and past setting values.

A connector 228 is connected to a communication contact point 41 of the camera 100 to allow communication between the lens driving circuit 226 and the system control circuit 50.

Also, the connector 228 supplies a power supply voltage from the power supply 86 into the imaging lens 220.

FIG. 2 is a top view of the mode dial switch 60. The mode dial switch 60 can be used to select OFF, M (Manual), P (Program), Tv (shutter priority), Av (aperture priority), LV (live view image capture), and MOVE (moving image capture) as image capture modes. One of these modes can be selected by turning the mode dial switch 60. Note that the camera 100 is powered on by turning the mode dial switch 60 from the OFF position to other positions. Also, the above-mentioned image capture modes are merely examples, and some of them or other image capture modes may be used.

Figure 3:
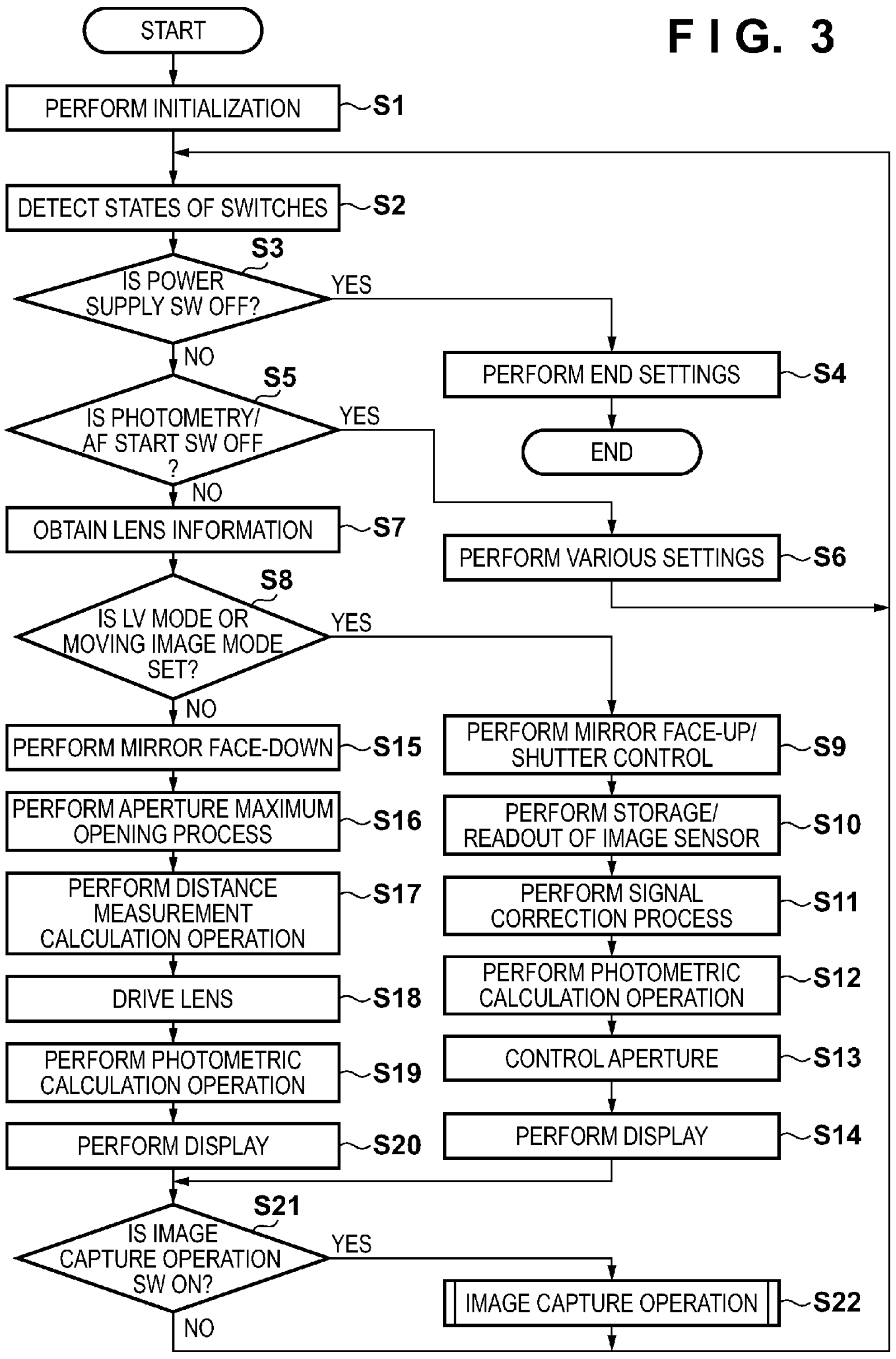
FIG. 3 is a flowchart showing the operation of a camera in the first embodiment.

FIG. 3 is a flowchart showing the procedure of a process of capturing an image by a digital camera in this embodiment. This process is executed under the control of the system control circuit 50 shown in FIG. 1.

In step S1 of FIG. 3, the system control circuit 50 performs initial settings such as register initialization, data initialization, and peripheral portion initialization. In step S2, the system control circuit 50 detects the states of, for example, camera shutter buttons (for example, a MENU button and SET button; not shown), a shutter operation button, a main electronic dial, a sub-electronic dial, and a mode dial switch.

If the mode dial switch 60 is OFF in step S3, the process advances to step S4, in which the system control circuit 50 performs end settings such as issuance of an OFF instruction to the peripheral circuit and data saving to end the operation of the camera, and ends the operation. If the mode dial switch 60 is ON in step S3, the process advances to step S5.

If the photometry/AF start SW is OFF in step S5, the process advances to step S6; otherwise, the process advances to step S7. In this case, the photometry/AF start SW corresponds to the image capture preparation switch SW1. In step S6, it is confirmed whether various setting buttons (not shown) have been operated. If these buttons have been operated, setting processes are performed, and the process returns to step S2.

In step S7, various types of information of the imaging lens attached to the camera are read. In obtaining lens information from the imaging lens 220, the system control circuit 50 communicates with the imaging lens 220 to obtain the lens information of the imaging lens 220. The lens information includes, for example, the lens unique information, focal length, aperture value, and focusing lens position.

If the mode dial switch 60 is in the LV mode (live view image capture mode) or the moving image mode (moving image capture mode) in step S8, the process advances to step S9; otherwise, the process advances to step S15. In step S9, the position of the main mirror 2 of the camera is detected, and if the mirror faces down, mirror face-up and shutter control are performed to guide an optical image of an object to the image sensor 5.

In step S10, storage and readout of the image sensor 5 are performed. In a signal correction process of step S11, the readout signal is corrected. In step S12, a photometric calculation operation is performed based on image capture data having undergone the signal correction process, and Av (aperture value) and Tv (shutter speed) are calculated from a predetermined program diagram (for example, FIG. 6).

In step S13, to obtain the aperture value calculated in step S12, the system control circuit 50 communicates with the imaging lens 220 to issue an aperture control instruction, and an instruction to turn on the application of a current to the coil of a stepping motor used to drive the aperture 224 (to be referred to as aperture current application hereinafter). The imaging lens 220 performs aperture control and aperture current application processes in accordance with the instructions issued from the camera in step S13.

An aperture current application process will be described in more detail herein with reference to a flowchart of a lens operation shown in FIG. 4. This lens flowchart is part of the operating program of the lens driving circuit 226.

If an aperture current application ON instruction is issued from the camera upon communication in step S301 of FIG. 4, the process advances to step S302. If an aperture current application OFF instruction is issued in step S301, the process advances to step S304. In step S302, the aperture current application state is confirmed. If the aperture current application is ON (a state in which a current is applied to the stepping motor is set) in step S302, the process returns and ends. If the aperture current application is OFF, the process advances to step S303, in which the aperture current application is turned on, and the process returns. In step S304, the aperture current application state is confirmed. If the aperture current application is OFF, the process returns; otherwise, the process advances to step S305, in which the aperture current application is turned off (a state in which no current is applied to the stepping motor, or a state in which the application of a current to the stepping motor is canceled is set), and the process returns. With the above-mentioned operation sequence shown in FIG. 4, ON and OFF of the aperture current application can be switched.

Referring back to FIG. 3, in step S14, the image captured by the image sensor 5 is displayed on the image display unit 28, and the process advances to step S21.

If the mode dial switch 60 is in neither the LV mode nor the moving image mode in step S8, in step S15 the position of the main mirror 2 of the camera is detected, and mirror face-down is performed if the mirror faces up. In step S16, if it is determined based on the aperture information of the lens information that the aperture 224 is stopped down, the lens is notified of an aperture maximum open instruction to open the aperture 224 to its maximum extent. After the aperture 224 is opened to its maximum extent, an aperture current application OFF instruction is issued.

In step S17, a distance measurement calculation operation is performed using the known phase difference detection scheme to adjust the focus on the object. In step S18, the amount of lens driving is calculated to drive the lens, based on the data obtained by the distance measurement calculation operation in step S17. In step S19, a photometric calculation operation is performed to determine, for example, the shutter speed (the charge storage time of the image sensor 5) and the aperture value, based on the camera settings such as the output from the photometric circuit, the set ISO sensitivity, and the image capture mode. In step S20, camera information including the shutter speed and aperture value obtained by, for example, the photometric calculation operation is displayed on the image display unit 28.

If the image capture operation SW is ON in step S21, the process advances to step S22, in which a still image capture operation is performed, and the process returns to step S2; otherwise, the process directly returns to step S2.

An image capture operation will be described in more detail below with reference to an image capture operation flowchart shown in FIG. 5. If the mode dial switch 60 is the LV mode or the moving image mode in step S101, the process directly advances to step S104; otherwise, the process advances to step S102. In step S102, an instruction is issued to a mirror control circuit (not shown) to start mirror face-up. After the mirror face-up is completed, the process advances to step S103. In step S103, a shutter front curtain is moved so that the image sensor 5 stands by for exposure.

In step S104, the system control circuit 50 communicates with the imaging lens 220 to obtain the lens information of the imaging lens 220. In step S105, the difference between the current aperture value and the aperture value calculated by the photometric calculation operation is calculated based on the lens information to determine the amount of stop, and the lens is notified of this amount of stop to drive the aperture. Also, if the aperture current application is OFF, an aperture current application ON instruction is issued to the lens. At this time, the current aperture value is stored in a RAM.

In step S106, the storage operation of the image sensor 5 starts. In this case, a storage operation starts upon the known electronic shutter control operation. In step S107, the storage operation ends at Tv (shutter speed) calculated by the photometric calculation operation. In step S108, the shutter rear curtain is moved. In step S109, an instruction is issued to the mirror control circuit (not shown) to perform mirror face-down. In step S110, an instruction is issued to a motor control circuit (not shown) to charge the shutter and mirror.

In step S111, the system control circuit 50 communicates with the imaging lens 220 to perform aperture control to obtain the aperture value stored in step S105. If the aperture value stored in step S105 is a maximum-aperture value, an aperture current application OFF instruction is issued to the lens; otherwise, the aperture current application is kept ON. In step S112, the signal readout process of the image sensor 5 is performed.

In a signal correction process of step S113, the readout signal is corrected. In an image compression process of step S114, the corrected signal (image signal) is compressed using a predetermined method. In step S115, header information is generated. In step S116, an image file is created from, for example, the header information and image signal. In step S117, the created image file is written in the hard disk, and the sequence of the image capture operation ends.

As described above, during an operation in the live view mode or the moving image capture mode, the lens aperture current application is kept ON while the aperture is stopped down. In this state, when a still image capture instruction is issued, the aperture is driven to obtain the aperture value at the time of image capture without temporarily opening the lens aperture to its maximum extent. This makes it possible to shorten the time taken to drive the aperture until the aperture value at the time of image capture is obtained, and, in turn, to shorten the release time lag.

Figure 7:
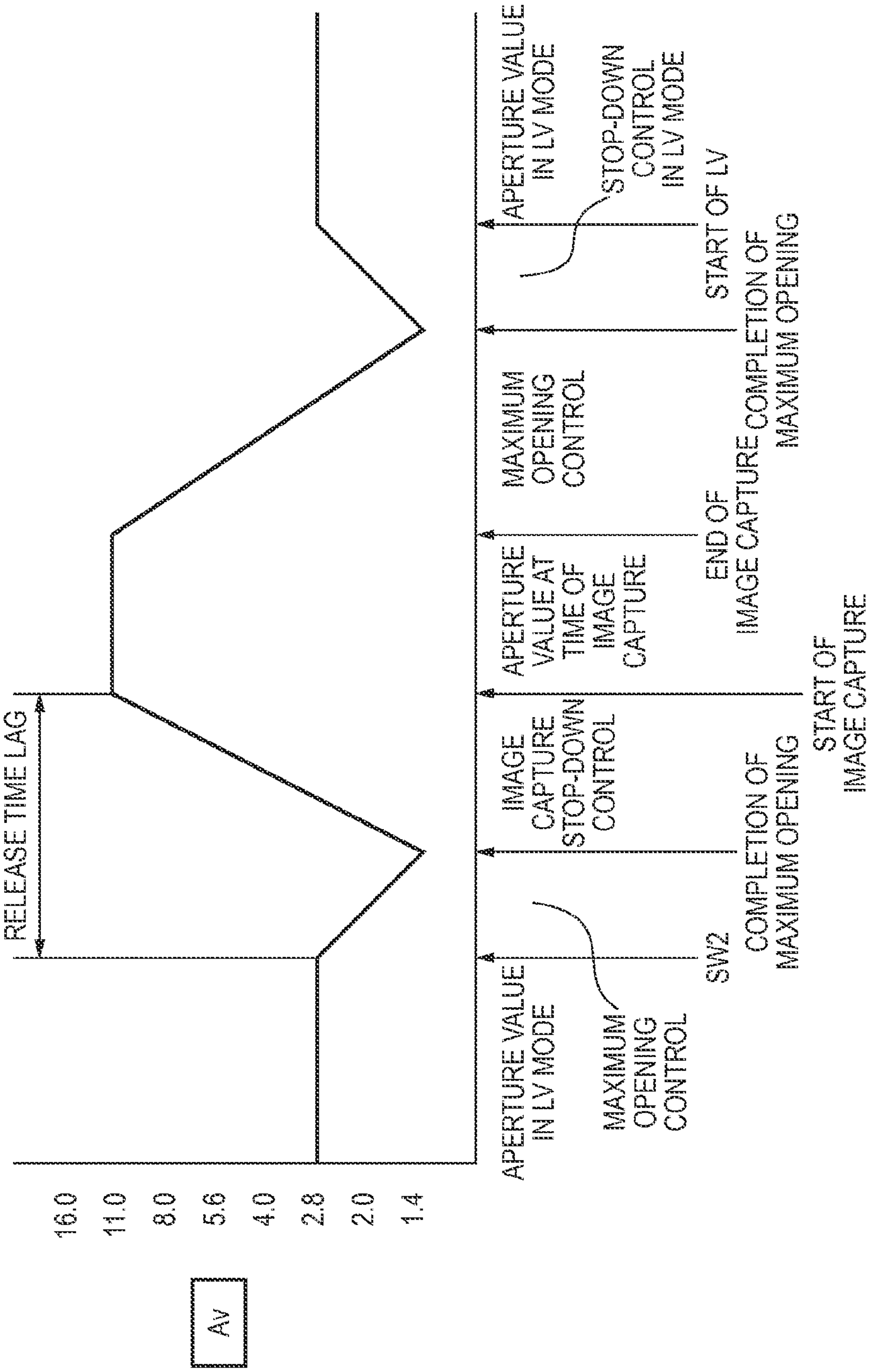
FIG. 7 is a chart showing a still image capture sequence in an LV of the related art.

The effect of this embodiment will be described with reference to FIGS. 7 and 8. FIG. 7 illustrates aperture control when a still image is captured in the conventional LV mode, and shows the lens aperture value on the ordinate and the sequence when a still image is captured in the LV mode on the abscissa.

Referring first to the left of FIG. 7, when the lens aperture is stopped down to F2.8 in the LV mode, the aperture is driven to temporarily open it to its maximum extent (to F1.4 in the case of the lens shown in FIG. 7) upon an image capture operation by the image capture start switch SW2. After the aperture driving is completed, the aperture is controlled to the aperture value at the time of still image capture (F11 in this example).

When the aperture is set at the aperture value at the time of still image capture, an image capture operation starts. During the image capture operation, the aperture value at the time of image capture is fixed. When the image capture operation ends, the aperture is driven to temporarily open it to its maximum extent. After the aperture driving is completed, the aperture value is returned to that in the LV mode. When the aperture value is returned to that in the LV mode, an LV starts.

As described above, the period from when the image capture start switch SW2 is turned on until the start of image capture, including the period in which the aperture is driven to temporarily open it to its maximum extent, becomes a release time lag.

Figure 8:
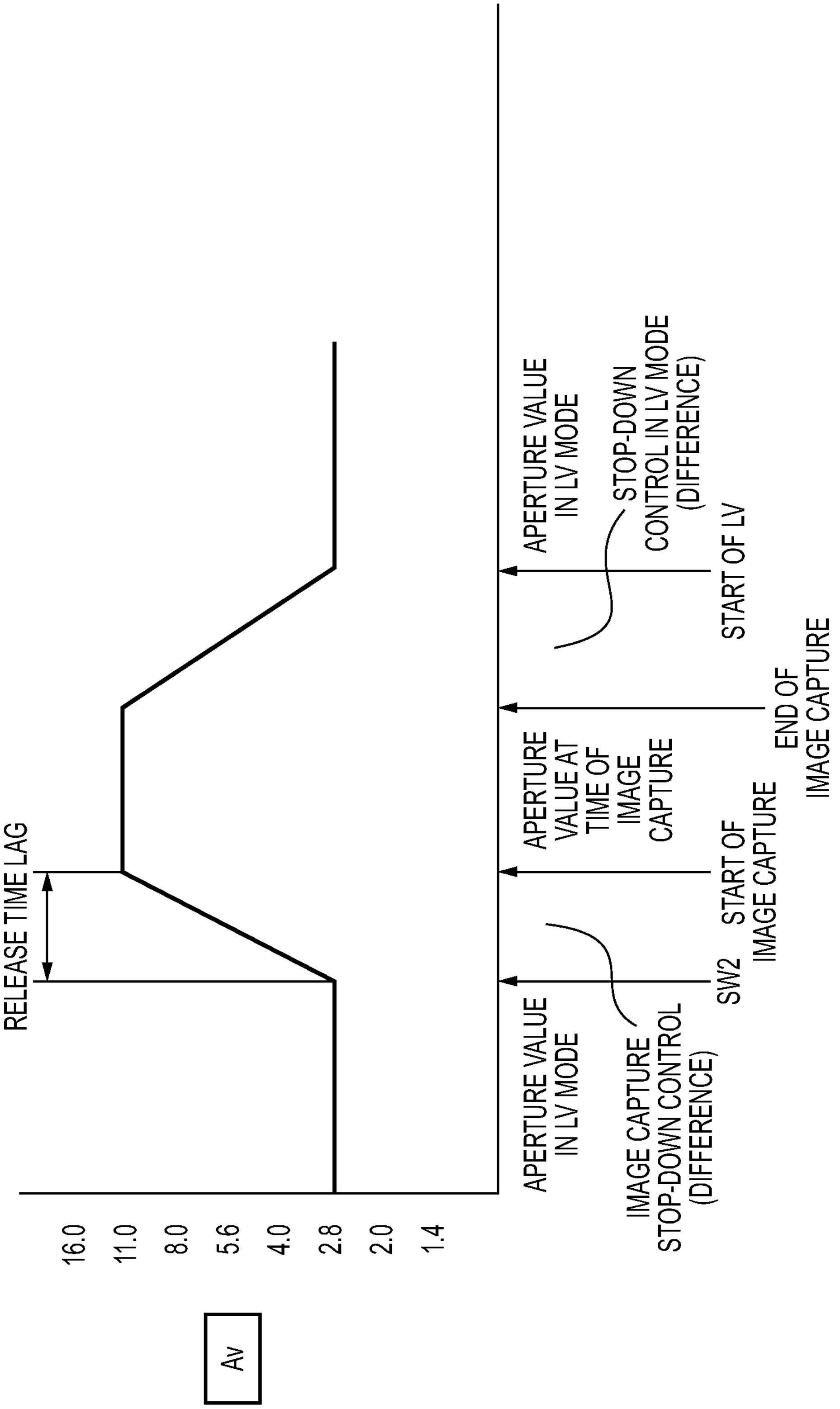
FIG. 8 is a chart showing a still image capture sequence in an LV of the first embodiment.

FIG. 8 illustrates aperture control when a still image is captured in the LV mode according to this embodiment. Referring first to the left of FIG. 8, when the lens aperture is stopped down to F2.8 in the LV mode, the aperture is driven to control the aperture value from F2.8 to that at the time of still image capture (for example, F11) upon an image capture operation by the image capture start switch SW2. When the aperture is set at the aperture value at the time of still image capture, an image capture operation starts. During the image capture operation, the aperture value at the time of image capture is fixed. After the still image capture operation, the aperture value is returned from that at the time of still image capture to that in the LV mode before still image capture. When the aperture value is returned to that in the LV mode, an LV starts. As described above, since the period in which the aperture is driven to temporarily open it to its maximum extent is omitted, the release time lag in the period from when a still image capture instruction is issued until the start of image capture is shortened. Again, since aperture maximum opening driving is omitted, the time taken to return the aperture value to that in the LV mode after still image capture can be shortened.

Second Embodiment

The second embodiment of the present invention will be described below with reference to FIGS. 9, 10, and 11. This embodiment relates to control in the so-called stop-down operation that can determine the depth of field at the time of still image capture, during composition confirmation.

The configuration of a single-lens reflex digital camera in the second embodiment is the same as that shown in FIG. 1, a mode dial switch 60 in the second embodiment is the same as that shown in FIG. 2, and a flowchart of the lens operation in the second embodiment is the same as that shown in FIG. 4, so a description thereof has already been given in the first embodiment and will not be given herein.

Figure 9:
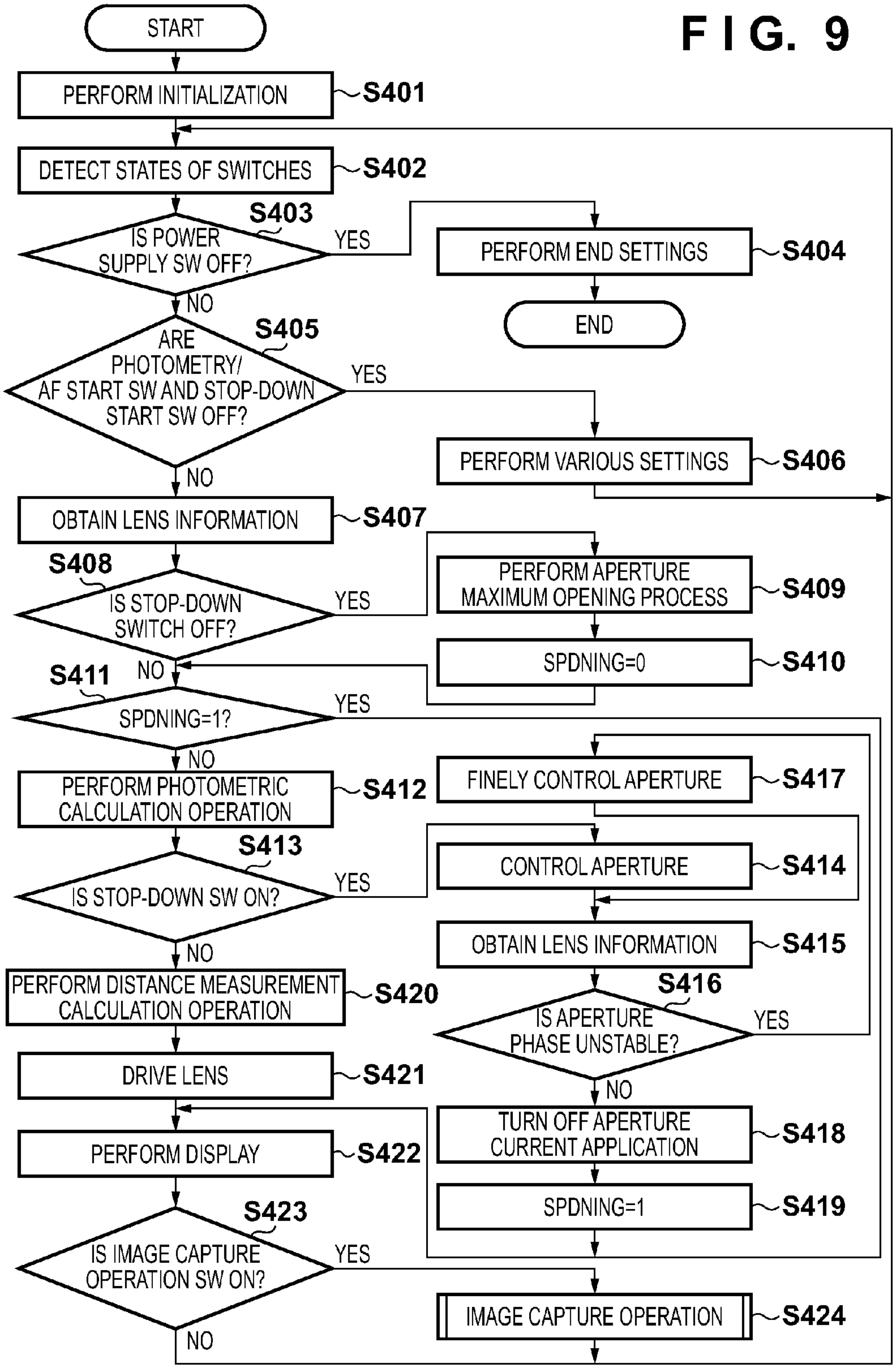
FIG. 9 is a flowchart showing the operation of a camera in the second embodiment.

FIG. 9 is a flowchart showing the procedure of an image capture process executed by the digital camera. This process is executed under the control of a system control circuit 50 shown in FIG. 1. In step S401 of FIG. 9, the system control circuit 50 performs initial settings such as register initialization, data initialization, and peripheral portion initialization.

In step S402, the system control circuit 50 detects the states of, for example, camera shutter buttons (for example, a MENU button and SET button; not shown), a shutter operation button, a main electronic dial, a sub-electronic dial, a mode dial switch, and a stop-down switch.

If the mode dial switch 60 is OFF in step S403, the process advances to step S404, in which the system control circuit 50 performs end settings such as issuance of an OFF instruction to the peripheral circuit and data saving to end the operation of the camera, and ends the operation. If the mode dial switch 60 is ON in step S403, the process advances to step S405.

If the photometry/AF start SW and stop-down SW are OFF in step S405, the process advances to step S406; otherwise, the process advances to step S407. In step S406, it is confirmed whether various setting buttons (not shown) have been operated. If these buttons have been operated, setting processes are performed, and the process returns to step S402.

In step S407, various types of information of the imaging lens attached to the camera are read. In obtaining lens information from an imaging lens 220, the system control circuit 50 communicates with the imaging lens 220 to obtain the lens information of the imaging lens 220. The lens information includes, for example, the lens unique information, focal length, aperture value, and focusing lens position.

If the stop-down SW is OFF in step S408, the process advances to step S409; otherwise, the process advances to step S411. In step S409, an aperture current application ON instruction is issued to the lens to open the lens aperture to its maximum extent. At this time, if the lens aperture is already open to its maximum extent, the aperture current application ON instruction is ignored and aperture current application is not performed. Note that no aperture current apply application ON instruction may be issued to the lens when the lens aperture is already open to its maximum extent. In step S410, a stop-down in progress flag SPDNING=0 stored in the memory is set to store information indicating that the lens is not being stopped down.

If SPDNING=1 in step S411, the lens is being stopped down, so the process advances to step S422 with neither a photometry nor a distance measurement process. If the lens is not being stopped down in step S411, the process advances to step S412. In step S412, a photometric calculation operation is performed to determine, for example, the shutter speed (the charge storage time of the image sensor 5) and the aperture value, based on the camera settings such as the output from the photometric circuit, the set ISO sensitivity, and the image capture mode.

If the stop-down SW is ON and an instruction is issued to stop the aperture down without still image capture in step S413, the process advances to step s414; otherwise, the process advances to step S420. In step S414, the system control circuit 50 communicates with the lens to narrow the difference between the lens maximum aperture value and the aperture value calculated in step S412. The lens receives the information sent upon this communication operation, and drives the stepping motor to drive the aperture. Moreover, the application of a current to the coil of the stepping motor in the lens is kept ON even after the stop-down operation. In step S415, the system control circuit 50 communicates with the lens to obtain lens information including aperture stable phase information.

An aperture stable phase process in step S416 will be described herein with reference to a flowchart of a lens operation shown in FIG. 10.

Figure 10:
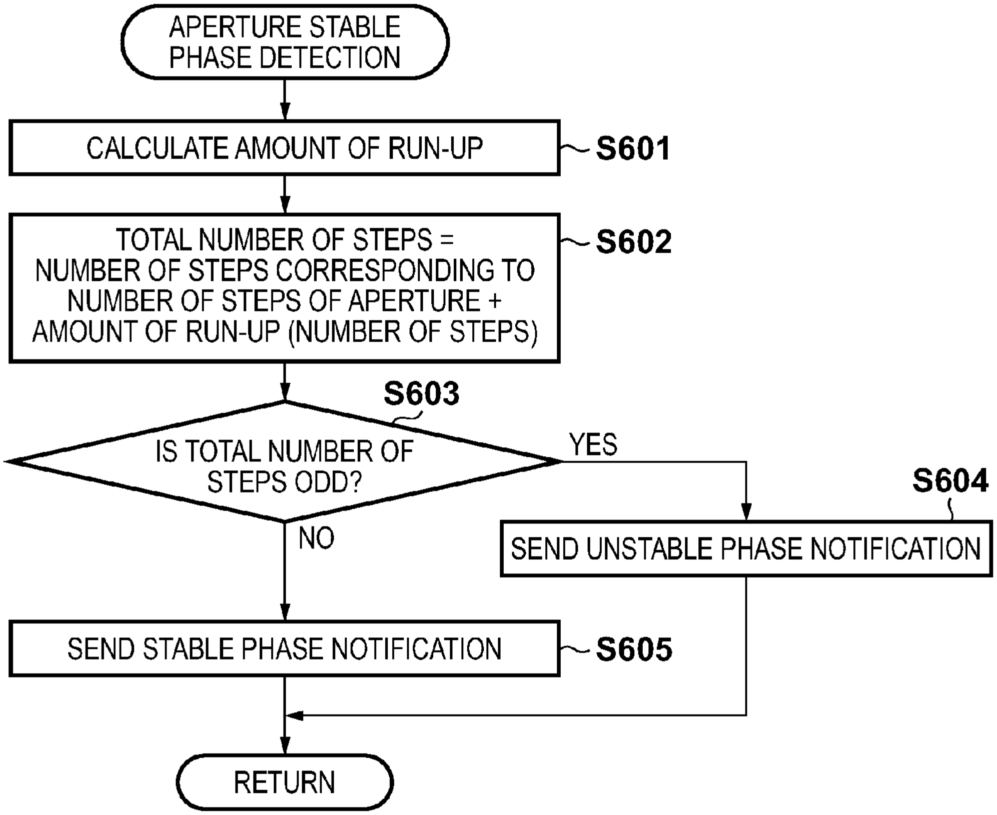
FIG. 10 is a flowchart showing lens aperture stable phase detection.
Figure 11:
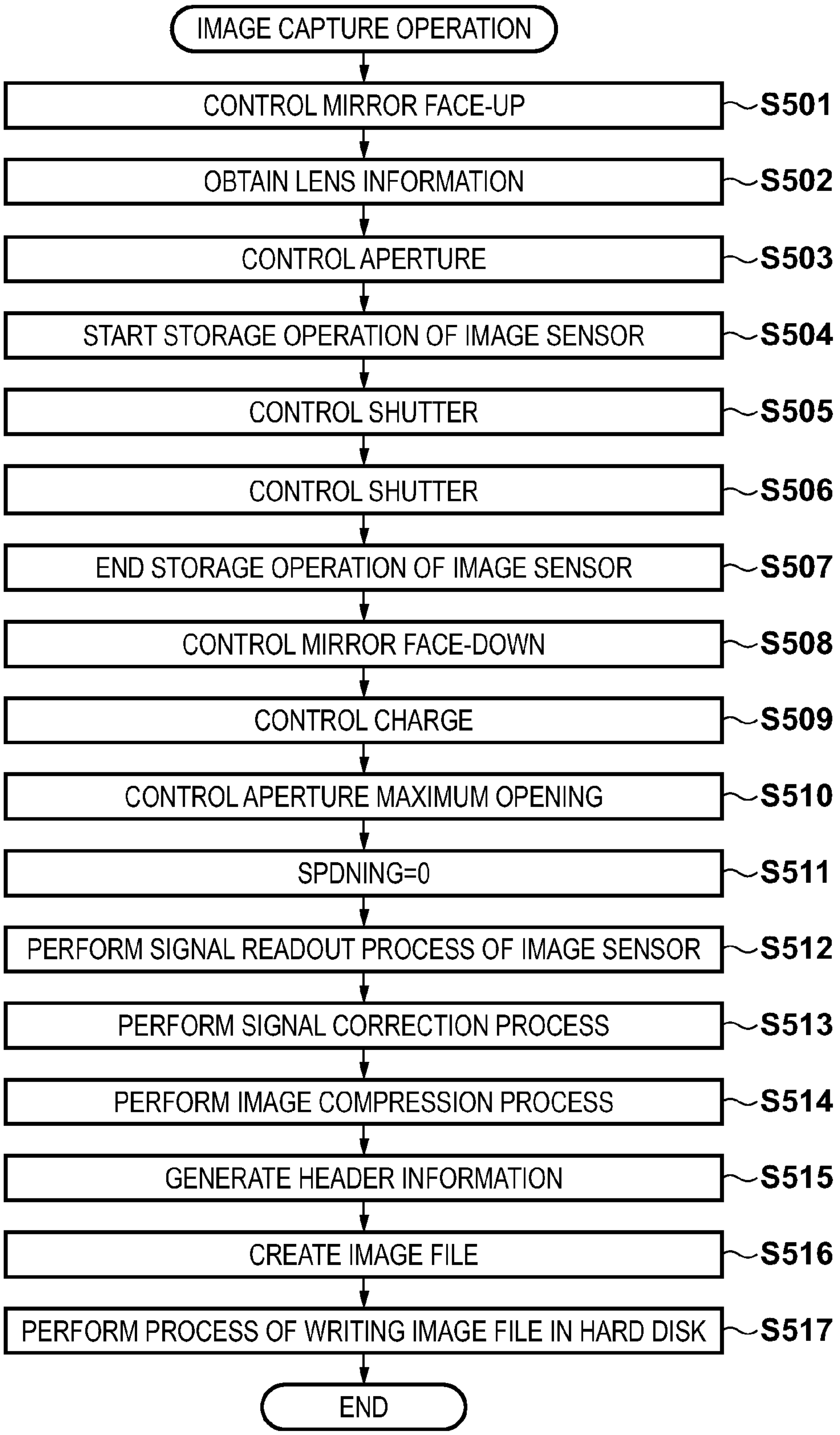
FIG. 11 is a flowchart showing the image capture operation of the camera in the second embodiment.

In step S601 of FIG. 10, the amount of aperture run-up is calculated. The amount of aperture run-up means the number of steps of the stepping motor, which is required to drive the aperture from the control end on the open side of an aperture 224 (an aperture position corresponding to the mechanical limit of aperture opening) to an aperture position corresponding to the maximum aperture value. In step S602, the total number of steps is calculated by adding the amount of aperture run-up and the number of steps corresponding to the current number of aperture steps. If the total number of steps is odd in step S603, the process advances to step S604; otherwise, the process advances to step S605. In step S604, it is notified that the phase will be unstable upon driving of the stepping motor to the camera by the total number of steps, and the process returns. In step S605, it is notified that the phase will be stable upon driving of the stepping motor to the camera by the total number of steps, and the process returns. Note that when the odd/even of the total number of steps and the stable/unstable state of the phase are opposite to the above case, the step to which the process advances from step S603 need only be changed in accordance with the total number of steps and the phase.

If it is determined in step S416 of FIG. 9 based on the lens information that the phase is unstable, the process advances to step S417, in which the system control circuit 50 communicates with the lens to finely drive the aperture, and the process advances to step S415. Upon this process, an aperture operation is repeated until a stable phase is obtained. If it is determined in step S416 that the phase is stable, the process advances to step S418. At this time, it is desired to finely drive the aperture to make it hard for the depth of field to change. Upon the fine driving of the aperture, the aperture value deviates from a desired aperture value, so the depth of field at the time of still image capture cannot accurately be reflected on it. However, upon the fine driving of the aperture to make it hard for the depth of field to change, the stepping motor can be set in a stable phase while keeping the difference from the depth of field at the time of still image capture small. In this way, since the aperture is driven until the stepping motor reaches a stable phase, the stopped position can be prevented from shifting after the application of a current to the stepping motor is turned OFF.

In step S418, the system control circuit 50 communicates with the lens to turn off the application of a current to the stepping motor which is driving the aperture. In step S419, SPDNING=1 is set to store information indicating that the lens is being stopped down, and the process advances to step S422.

If the stop-down SW is OFF in step S413, a distance measurement calculation operation is performed using the known phase difference detection scheme to adjust the focus on the object in step S420. In step S421, the amount of lens driving is calculated to drive the lens, based on the data obtained by the distance measurement calculation operation in step S420. In step S422, camera information including the shutter speed and aperture value obtained by, for example, the photometric calculation operation is displayed on an image display unit 28.

If the image capture operation SW is ON in step S423, the process advances to step S424, in which a still image capture operation is performed, and the process returns to step S402; otherwise, the process directly returns to step S402.

An image capture operation will be described herein with reference to an image capture operation flowchart shown in FIG. 11. In step S501 of FIG. 11, an instruction is issued to a mirror control circuit (not shown) to start mirror face-up. After the mirror face-up is completed, the process advances to step S502. In step S502, the system control circuit 50 communicates with the imaging lens 220 to obtain the lens information of the imaging lens 220, including its aperture information.

In step S503, the difference between the current aperture value and the aperture value calculated by the photometric calculation operation is calculated based on the lens information to determine the amount of stop, and the lens is notified of this amount of stop to drive the aperture. Even after the aperture driving operation, the aperture current application is kept ON. In step S504, the storage operation of an image sensor 5 starts. In step S505, a shutter front curtain is moved to start exposure of the image sensor 5. In step S506, a shutter rear curtain is moved at Tv (shutter speed) calculated by the photometric calculation operation. In step S507, the storage operation of the image sensor 5 ends.

In step S508, an instruction is issued to the mirror control circuit (not shown) to perform mirror face-down. In step S509, an instruction is issued to a motor control circuit (not shown) to charge the shutter and mirror. In step S510, the system control circuit 50 communicates with the imaging lens 220 to control the aperture open to its maximum extent. In step S511, SPDNING=0 is set to store information indicating that the lens is not being stopped down.

In step S512, the signal readout process of the image sensor 5 is performed. In a signal correction process of step S513, the readout signal is corrected. In an image compression process of step S514, the corrected signal (image signal) is compressed using a predetermined method. In step S515, header information is generated. In step S516, an image file is created from, for example, the header information and image signal. In step S517, the created image file is written in the hard disk, and the sequence of the image capture operation ends.

As described above, to know the depth of field at the time of still image capture by pressing the stop-down button, the aperture stopped position is controlled stable, and the aperture current application is turned off. Hence, during a stop-down operation, a state free from any aperture error as the current application is turned off is maintained while suppressing power consumption. Also, when a still image is captured while the lens is being stopped down, an image capture operation is performed without temporarily opening the aperture to its maximum extent, thus shortening the release time lag.

Third Embodiment

The third embodiment of the present invention will be described below with reference to FIG. 12. This embodiment relates to control upon turn-off of the application of a current to a stepping motor used to drive an aperture 224 in the LV mode or the moving image mode.

The configuration of a single-lens reflex digital camera in the third embodiment is the same as that shown in FIG. 1, a mode dial switch 60 in the third embodiment is the same as that shown in FIG. 2, and a flowchart of the lens operation in the third embodiment is the same as that shown in FIG. 4, so a description thereof has already been given in the first embodiment and will not be given herein. Also, an aperture stable phase process in the third embodiment is the same as that shown in FIG. 10, so a description thereof has already been given in the second embodiment and will not be given herein.

Figure 12:
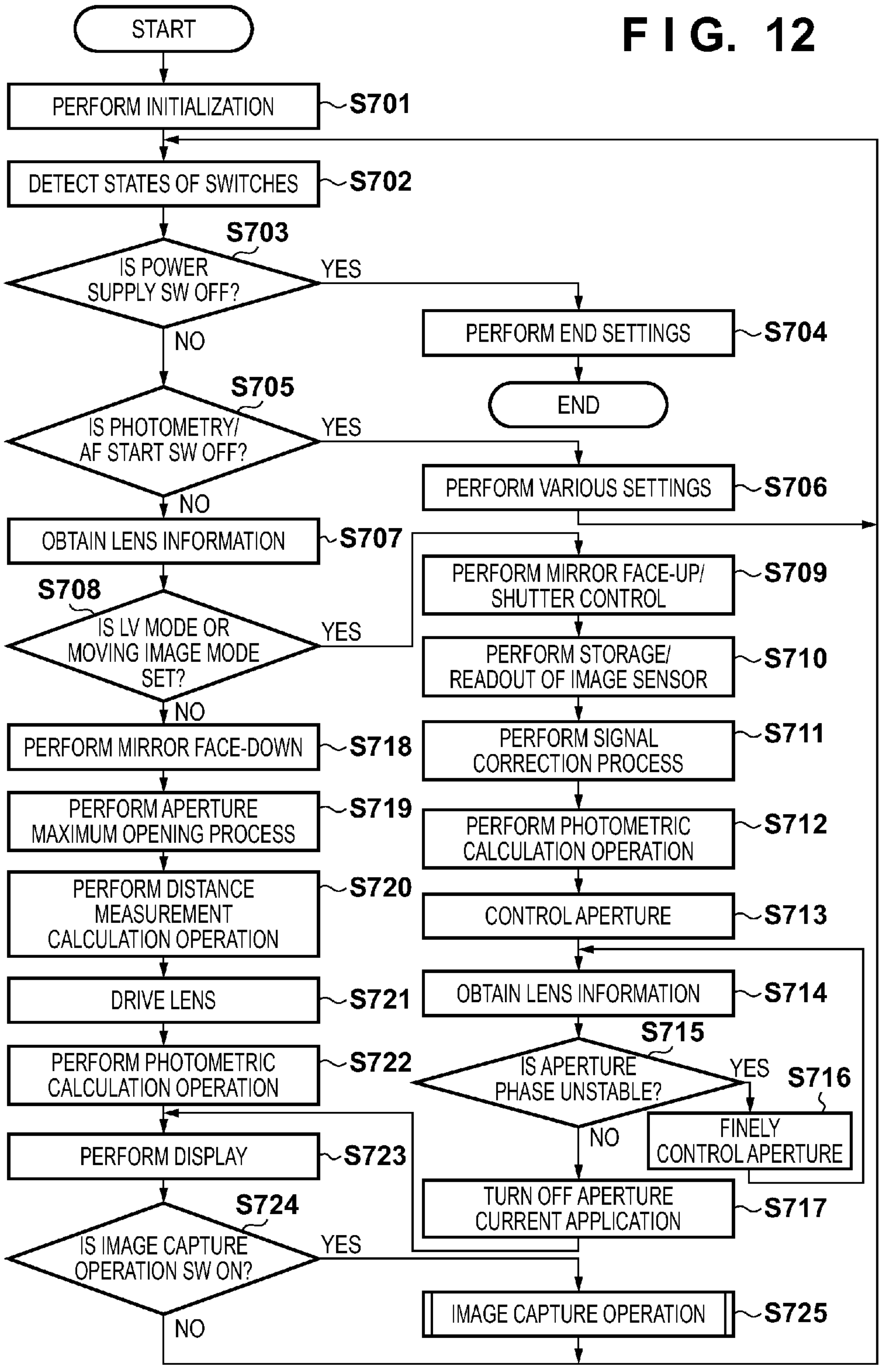
FIG. 12 is a flowchart showing the operation of a camera in the third embodiment.

FIG. 12 is a flowchart showing the procedure of an image capture process executed by the digital camera. This process is executed under the control of a system control circuit 50 shown in FIG. 1. In step S701 of FIG. 12, the system control circuit 50 performs initial settings such as register initialization, data initialization, and peripheral portion initialization.

In step S702, the system control circuit 50 detects the states of, for example, camera shutter buttons (for example, a MENU button and SET button; not shown), a shutter operation button, a main electronic dial, a sub-electronic dial, a mode dial switch, and a stop-down switch.

If the mode dial switch 60 is OFF in step S703, the process advances to step S704, in which the system control circuit 50 performs end settings such as issuance of an OFF instruction to the peripheral circuit and data saving to end the operation of the camera, and ends the operation. If the mode dial switch 60 is ON in step S703, the process advances to step S705.

If the photometry/AF start SW is OFF in step S705, the process advances to step S706; otherwise, the process advances to step S707. In step S706, it is confirmed whether various setting buttons (not shown) have been operated. If these buttons have been operated, setting processes are performed, and the process returns to step S702. In step S707, various types of information of the imaging lens attached to the camera are read. In obtaining lens information from an imaging lens 220, the system control circuit 50 communicates with the imaging lens 220 to obtain the lens information of the imaging lens 220. The lens information includes, for example, the lens unique information, focal length, aperture value, and focusing lens position.

If the mode dial switch 60 is in the LV mode or the moving image mode in step S708, the process advances to step S709; otherwise, the process advances to step S718.

In step S709, the position of a main mirror 2 of the camera is detected, and if the mirror faces down, mirror face-up and shutter control are performed to guide an optical image of an object to an image sensor 5. In step S710, storage and readout of the image sensor 5 are performed. In a signal correction process of step S711, the readout signal is corrected.

Figure 6:
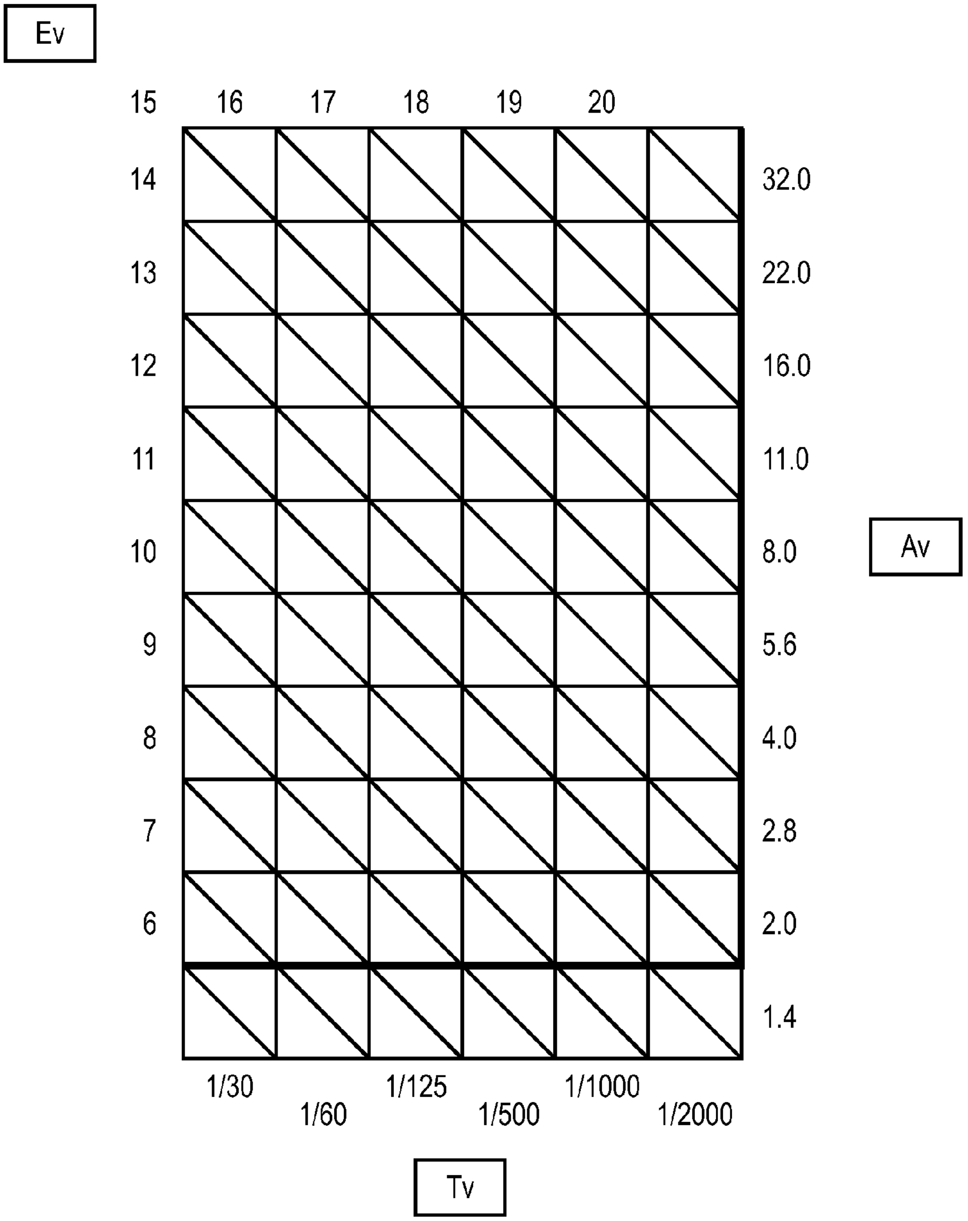
FIG. 6 is a program diagram of calculation of Tv and Av.

In step S712, a photometric calculation operation is performed based on image capture data having undergone the signal correction process, and Av (aperture value) and Tv (shutter speed) are calculated from a predetermined program diagram (for example, FIG. 6). In step S713, the system control circuit 50 communicates with the lens to narrow the difference between the lens maximum aperture value and the aperture value calculated in step S712. The lens receives the information sent upon this communication operation, and drives the stepping motor to drive the aperture. Moreover, the application of a current to the stepping motor in the lens is kept ON even after the stop-down operation. In step S714, the system control circuit 50 communicates with the lens to obtain lens information including aperture stable phase information.

If it is determined in step S715 of FIG. 12 based on the lens information that the phase is unstable, the process advances to step S716, in which the system control circuit 50 communicates with the lens to finely drive the aperture, and the process advances to step S714. Upon this process, an aperture operation is repeated until a stable phase is obtained. Since an aperture stable phase process has already been described in the second embodiment, a description thereof will not be given. If it is determined in step S715 that the phase is stable, the process advances to step S717. In step S717, the system control circuit 50 communicates with the lens to turn off the application of a current to the coil of the stepping motor which is driving the aperture, and the process advances to step S723.

If the mode dial switch 60 is in neither the LV mode nor the moving image mode in step S708, in step S718 the position of the main mirror 2 of the camera is detected, and mirror face-down is performed if the mirror faces up. In step S719, if it is determined based on the aperture information of the lens information that the lens aperture is stopped down, the lens is notified of an aperture maximum open instruction to turn on the application of a current to the stepping motor, thereby opening the lens aperture to its maximum extent.

In step S720, a distance measurement calculation operation is performed using the known phase difference detection scheme to adjust the focus on the object. In step S721, the amount of lens driving is calculated to drive the lens, based on the data obtained by the distance measurement calculation operation in step S720. In step S722, a photometric calculation operation is performed to determine, for example, the shutter speed and the aperture value, based on the camera settings such as the output from the photometric circuit, the set ISO sensitivity, and the image capture mode.

In step S723, camera information including the shutter speed and aperture value obtained by, for example, the photometric calculation operation is displayed on an image display unit 28, or an image captured by the image sensor 5 is displayed on the image display unit 28 in the LV mode or the moving image mode.

If the image capture operation SW is ON in step S724, the process advances to step S725, in which a still image capture operation is performed, and the process returns to step S702; otherwise, the process directly returns to step S702. An image capture operation is performed in accordance with the flowchart shown in FIG. 5. Since details of FIG. 5 have already been described in the first embodiment, a description thereof will not be given herein.

As described above, in the LV mode or the moving image mode, the aperture stopped position is controlled stable, and the aperture current application is turned off, so a state free from any aperture error as the current application is turned off is maintained while suppressing power consumption. Also, when an image capture operation is performed in the LV mode or the moving image mode, the aperture is driven to obtain the aperture value at the time of image capture without temporarily opening the aperture to its maximum extent, thus shortening the release time lag.

Fourth Embodiment

Figure 13:
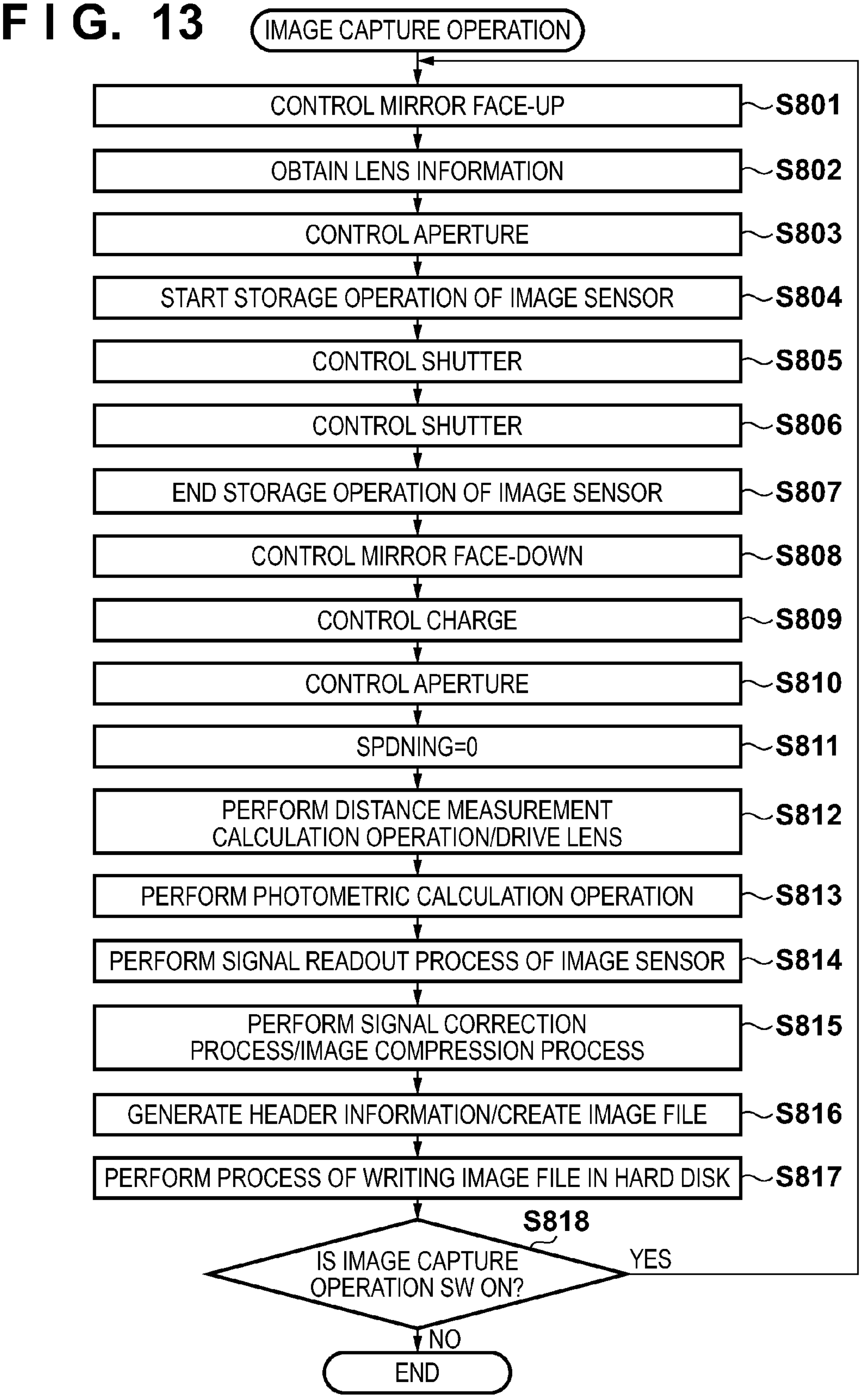
FIG. 13 is a flowchart showing the image capture operation of a camera in the fourth embodiment.

The fourth embodiment of the present invention will be described below with reference to FIG. 13. This embodiment relates to control at the time of so-called continuous shooting in which still images are continuously shot.

The configuration of a single-lens reflex digital camera in the fourth embodiment is the same as that shown in FIG. 1, a mode dial switch 60 in the fourth embodiment is the same as that shown in FIG. 2, and a flowchart of the lens operation in the fourth embodiment is the same as that shown in FIG. 4, so a description thereof has already been given in the first embodiment and will not be given herein. Also, FIG. 9 is a flowchart showing the operation sequence of the camera in the fourth embodiment, and FIG. 10 shows an aperture stable phase process in the fourth embodiment, so a description thereof has already been given in the second embodiment and will not be given herein.

An image capture operation will be described herein with reference to an image capture operation flowchart shown in FIG. 13. In step S801 of FIG. 13, an instruction is issued to a mirror control circuit (not shown) to start mirror face-up. After the mirror face-up is completed, the process advances to step S802. In step S802, a system control circuit 50 communicates with an imaging lens 220 to obtain the lens information of the imaging lens 220, including its aperture information. In step S803, the difference between the current aperture value and the aperture value calculated by the photometric calculation operation is calculated based on the lens information to determine the amount of stop, and the lens is notified of this amount of stop to drive the aperture. The aperture current application is kept ON.

In step S804, the storage operation of an image sensor 5 starts. In step S805, a shutter front curtain is moved to start exposure of the image sensor 5. In step S806, a shutter rear curtain is moved at Tv (shutter speed) calculated by the photometric calculation operation. In step S807, the storage operation of the image sensor 5 ends.

In step S808, an instruction is issued to the mirror control circuit (not shown) to perform mirror face-down. In step S809, an instruction is issued to a motor control circuit (not shown) to charge the shutter and mirror. In step S810, the system control circuit 50 communicates with the imaging lens 220 to open the aperture to an aperture value at which photometry is possible if the aperture is stopped down to an aperture value at which photometry is impossible.

If the stop-down SW is pressed after the image capture sequence, SPDNING=0 is set to perform a stop-down operation again in step S811. In step S812, a distance measurement calculation operation is performed using the known phase difference detection scheme to adjust the focus on the object, and the amount of lens driving is calculated to drive the lens, based on the data obtained by the distance measurement calculation operation.

In step S813, a photometric calculation operation is performed to determine, for example, the shutter speed and the aperture value, based on the camera settings such as the output from the photometric circuit, the set ISO sensitivity, and the image capture mode. In step S814, the signal readout process of the image sensor 5 is performed. In step S815, the readout signal is corrected in a signal correction process, and compressed using a predetermined method in an image compression process.

In step S816, header information is generated, and an image file is created from, for example, the header information and image signal. In step S817, the created image file is written in the hard disk. If the image capture operation SW is ON in step S818, the process returns to step S801, in which an image capture operation is repeated; otherwise, the process ends.

As described above, during continuous shooting, the aperture is driven without temporarily opening it to its maximum extent, thus shortening the release time lag associated with aperture control.

Fifth Embodiment

Figure 14:
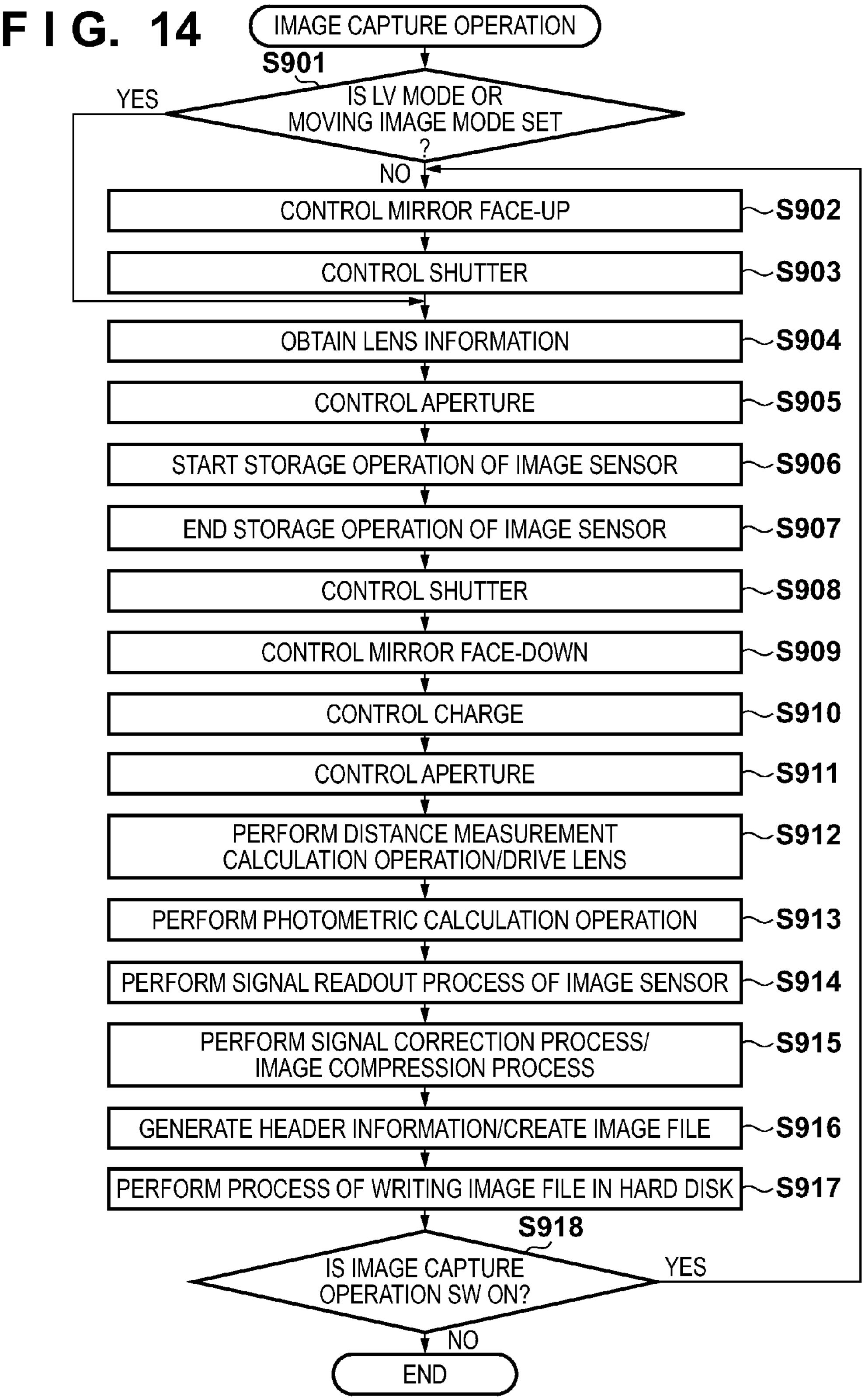
FIG. 14 is a flowchart showing the image capture operation of a camera in the fifth embodiment.

The fifth embodiment of the present invention will be described below with reference to FIG. 14. This embodiment relates to control at the time of continuous shooting in the LV mode or the moving image mode.

The configuration of a single-lens reflex digital camera in the fifth embodiment is the same as that shown in FIG. 1, a mode dial switch 60 in the fifth embodiment is the same as that shown in FIG. 2, and a flowchart of the lens operation in the fifth embodiment is the same as that shown in FIG. 5, so a description thereof has already been given in the first embodiment and will not be given herein. Also, FIG. 12 is a flowchart showing the operation sequence of the camera in the fifth embodiment, so a description thereof has already been given in the third embodiment and will not be given herein.

An image capture operation will be described herein with reference to an image capture operation flowchart shown in FIG. 14. If the mode dial switch 60 is in the LV mode or the moving image mode in step S901, the process advances to step S904; otherwise, the process advances to step S902.

In step S902, an instruction is issued to a mirror control circuit (not shown) to start mirror face-up. After the mirror face-up is completed, the process advances to step S903. In step S903, a shutter front curtain is moved so that an image sensor 5 stands by for exposure. In step S904, a system control circuit 50 communicates with an imaging lens 220 to obtain the lens information of the imaging lens 220.

In step S905, the difference between the current aperture value and the aperture value calculated by the photometric calculation operation is calculated based on the lens information to determine the amount of stop, and the lens is notified of this amount of stop to drive the aperture. Also, an aperture current application ON instruction is issued to the lens. At this time, the current aperture value is stored in a RAM.

In step S906, the storage operation of the image sensor 5 starts. In this case, a storage operation starts upon the known electronic shutter control operation. In step S907, the storage operation ends at Tv (shutter speed) calculated by the photometric calculation operation. In step S908, a shutter rear curtain is moved. In step S909, an instruction is issued to the mirror control circuit (not shown) to perform mirror face-down. In step S910, an instruction is issued to a motor control circuit (not shown) to charge the shutter and mirror.

In step S911, the system control circuit 50 communicates with the imaging lens 220 to open the aperture to an aperture value at which photometry is possible if the aperture is stopped down to an aperture value at which photometry is impossible. In step S912, a distance measurement calculation operation is performed using the known phase difference detection scheme to adjust the focus on the object, and the amount of lens driving is calculated to drive the lens, based on the data obtained by the distance measurement calculation operation.

In step S913, a photometric calculation operation is performed to determine, for example, the shutter speed and the aperture value, based on the camera settings such as the output from the photometric circuit, the set ISO sensitivity, and the image capture mode. In step S914, the signal readout process of the image sensor 5 is performed.

In step S915, the readout signal is corrected in a signal correction process, and compressed using a predetermined method in an image compression process. In step S916, header information is generated, and an image file is created from, for example, the header information and image signal. In step S917, the created image file is written in the hard disk. If the image capture operation SW is ON in step S918, the process returns to step S902, in which an image capture operation is repeated; otherwise, the process ends.

As described above, during continuous shooting in the LV mode or the moving image mode, the aperture is driven without temporarily opening it to its maximum extent, thus shortening the release time lag associated with aperture control.

Note that in the above-mentioned five embodiments, the system control circuit 50 may at least partially perform the process performed by the lens driving circuit 226.

Also, in the above-mentioned five embodiments, the lens driving circuit 226 may at least partially perform the process performed by the system control circuit 50.

Moreover, although the case wherein the present invention is applied to a single-lens reflex digital camera has been described in the above-mentioned five embodiments, the present invention may be applied to a camera including an internal imaging lens. Alternatively, the present invention may be applied to a camera with no mirror which is free to move to a position oblique to a photographic optical path as observed, or a position retracted from the photographic optical path in an image capture state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264113, filed Dec. 1, 2011, which is hereby incorporated by reference herein in its entirety.

What is claimed is:

1. An image capture system including an image capture apparatus and an imaging lens detachable from the image capture apparatus, the system comprising:

an image capture unit which captures an image of an object;

an aperture which adjusts an amount of light;

a stepping motor of a configured to control said aperture; and a system control unit which controls to, when a still image capture instruction is issued during said aperture is stopped down and said stepping motor is in a current applied state, drive said aperture by a difference between an aperture value when said aperture is stopped down and an aperture value for still image capture without driving said aperture to open its maximum extent on the way to a position corresponding to the aperture value for still image capture.

2. The system according to claim 1, further comprising:

a display unit which displays an image based on image data obtained by said image capture unit, wherein said system control unit controls to set said stepping motor in a current applied state when said aperture is stopped down and an image based on image data obtained by said image capture unit is sequentially displayed on said display unit.

3. The system according to claim 2, wherein said system control unit controls to, when a still image capture instruction is issued during said aperture is stopped down and an image based on image data obtained by said image capture unit is sequentially displayed on said display unit, drive said aperture by a difference between the aperture value when said aperture is stopped down and the aperture value for still image capture, and to drive said aperture by the difference between the aperture value when said aperture is stopped down and the aperture value for still image capture so that an aperture value before still image capture is obtained after the still image capture.

4. An image capture apparatus from which an imaging lens which drives an aperture using a stepping motor is detachable, the apparatus comprising:

a system control unit which controls to, when a still image capture instruction is issued during the aperture is stopped down and said stepping motor is in a current applied state, drive the aperture by a difference between an aperture value when the aperture is stopped down and an aperture value for still image capture without driving said aperture to open its maximum extent on the way to a position corresponding to the aperture value for still image capture.

5. An imaging lens detachable from an image capture apparatus, the lens comprising:

an aperture; and a stepping motor configured to drive said aperture, wherein said stepping motor is set in a current applied state when said aperture is stopped down, and when a still image capture instruction is issued during said aperture is stopped down, said aperture is driven by a difference between an aperture value when said aperture is stopped down and an aperture value for still image capture without driving said aperture to open its maximum extent on the way to a position corresponding to the aperture value for still image capture.

* * * * *